US008468065B2

United States Patent
Han et al.

(10) Patent No.: US 8,468,065 B2
(45) Date of Patent: Jun. 18, 2013

(54) LAUNDRY ROOM MANAGEMENT METHOD AND SYSTEM

(75) Inventors: In-Hee Han, Changwon-shi (KR); Kang-Mo Choi, Masan-shi (KR); Ji-An Jeong, Changwon-shi (KR); Nam-Yeong Heo, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 864 days.

(21) Appl. No.: 11/753,015

(22) Filed: May 24, 2007

(65) Prior Publication Data

US 2008/0027816 A1    Jan. 31, 2008

(30) Foreign Application Priority Data

May 26, 2006 (KR) .................. 10-2006-0047732

(51) Int. Cl.
*G07B 17/00* (2006.01)
*G07F 19/00* (2006.01)
*G05B 11/01* (2006.01)

(52) U.S. Cl.
USPC ............. 705/28; 700/17; 700/23; 700/83; 700/90; 700/236; 705/30; 705/400

(58) Field of Classification Search
CPC ....... G06Q 40/00; G06Q 40/10; G06Q 40/02; G05B 13/027; G05B 17/02
USPC ............ 705/20, 30; 700/17, 236, 238, 18, 700/83, 169; 715/854; 62/127; 340/5.92, 340/825.02; 8/159
See application file for complete search history.

(56) References Cited

U.S. PATENT DOCUMENTS

| | | | | |
|---|---|---|---|---|
| 4,369,442 A * | 1/1983 | Werth et al. | | 377/7 |
| 4,523,285 A * | 6/1985 | Hendrickson et al. | | 700/238 |
| 5,386,362 A * | 1/1995 | Keret | | 705/30 |
| 5,799,281 A * | 8/1998 | Login et al. | | 705/1.1 |
| 6,167,327 A * | 12/2000 | Broker et al. | | 700/238 |
| 6,369,841 B1 * | 4/2002 | Salomon et al. | | 715/854 |
| 6,502,265 B2 * | 1/2003 | Blair et al. | | 8/159 |
| 6,862,496 B2 * | 3/2005 | Fukuoka et al. | | 700/237 |
| 7,164,956 B2 * | 1/2007 | Bicknell et al. | | 700/83 |
| 7,177,712 B2 * | 2/2007 | Blair et al. | | 700/83 |
| 2006/0122901 A1 * | 6/2006 | Kawabata | | 705/26 |
| 2008/0287121 A1 * | 11/2008 | Ebrom et al. | | 455/426.1 |

OTHER PUBLICATIONS

Sheehan, K. (2006). Cutting-edge laundry rooms deliver convenience. Multi-Housing News, 41(12), 36-36,41. Retrieved from http://search.proquest.com/docview/236946038?accountid=14753.*
German Office Action dated Mar. 20, 2008.
Chinese Office Action dated Feb. 12, 2009.
German Office Action dated Jul. 19, 2010 and English translation.

* cited by examiner

*Primary Examiner* — Olusegun Goyea
(74) *Attorney, Agent, or Firm* — KED & Associates, LLP (57) ABSTRACT

The present invention discloses a method and system of managing a laundry room. In the method, identification information including an ID (identifier) is received through a communicator. Then, information about the rate and operating conditions is set through the communicator. A predetermined operation allowed by the setting is performed according to a received payment after receiving information about insertion of the payment from the payment device. While performing, operating information is recorded. Then, the recorded operating information is transmitted in response to a request of the communicator.

19 Claims, 5 Drawing Sheets

LAUNDRY ROOM MANAGEMENT METHOD AND SYSTEM

TECHNICAL FIELD

The present invention relates to a laundry room management method and system, and more particularly, to a laundry room management system including laundry room machines such as a washer and a dryer, a communicator such as a personal digital assistant (PDA), a computer, and a payment device such as a coin drop assembly and a card reader, and a laundry room management method using the same.

BACKGROUND ART

Generally, a commercial laundry room machine means a laundry room machine in a laundry room for providing self-laundry service, which has a payment device such as a coin drop assembly and a card reader. Such a commercial laundry room machine may be a coin-operated washer, a coin-operated dryer, or an all-in-one coin-operated washer and dryer. A laundry room includes a plurality of laundry room machines.

Accordingly, it is required to manage the laundry room and the laundry room machines. In order to effectively and efficiently manage a plurality of the laundry room machines and the laundry room, it is required not only to manage the operating information of the laundry room machines but also to control operators. Also, the laundry room machines must be protected from malicious attacks by customers. For example, the laundry room machines must be protected from being used for free or the operating conditions of the laundry room machine must be prevented from being changed by customers. In order to protect and prevent the laundry room machine from such malicious attacks, the laundry room machine must support a predetermined protection in physical and software manner.

DISCLOSURE OF THE INVENTION

The present invention is achieved to solve the above problems. An object of the present invention is to provide a laundry room management method and system for effectively and efficiently managing laundry room machines in a laundry room.

Another object of the present invention is to provide a laundry room management method and system for enabling a manager to control laundry room machines equipped in the laundry room.

Yet another object of the present invention is to provide a laundry room management method and system for protecting laundry room machines from malicious attack made by customers.

Yet another object of the present invention is to provide a laundry room management method and system for separately managing laundry room machines by assigning identification information to laundry room machines through a communicator and for stably managing the laundry room machines without confusion by preventing the assigned identification information from being modified.

Yet another object of the present invention is to provide a laundry room management method and system for effectively and efficiently managing the laundry room machines without additional high expenses and additional equipment by separately managing the laundry room machines in software manner using a communicator such as a personal digital assistant (PDA), which intermediates communication between a plurality of laundry room machines and a personal computer (PC).

Yet another object of the present invention is to provide a laundry room management method and system for managing managers by defining authority of managers logged in a communicator.

Yet another object of the present invention is to provide a laundry room management method and system for preventing setting of laundry room machine from being modified by customers by setting the laundry room machine using a communicator or a master key.

In order to achieve the above-described objects of the invention, there is provided a laundry room management method using a laundry room management system including laundry room machines in a laundry room and used for performing at least one of a washing operation and a drying operation, payment devices mounted on each of the laundry room machines for collecting payment for operating the laundry room machines, a computer for managing operating information of the laundry room machines, and a communicator for intermediating operating information between the laundry room machines and the computer, the method including the steps of: a) receiving identification information including an ID (identifier) through the communicator; b) setting information about the rate and operating conditions through the communicator; c) performing a predetermined operation allowed by the setting of the step b) according to an inserted payment after receiving information about insertion of the payment from the payment device; d) recording operating information of the performed operation in the step c); and e) transmitting the recorded operating information in response to a request of the communicator.

In the step b), identification information may be transferred from the communicator with the rate and operating conditions, and the step b) may include the step of comparing the transferred identification information with the received identification information of the step a).

In the step e), the identification information received at the step a) and the recorded operating information may be transmitted to the communicator.

The laundry room management system may further include a master key recognizable by the laundry room machines through the payment device, and the step b) may be performed when the compared identification information are matched or when the master key is inserted.

The identification information received at the step a) may be modified only before the identification information is inputted to the laundry room machine.

The laundry room management method may further include the step of displaying operating information transmitted to the communicator through the communicator.

The laundry room management method may further include the step of transmitting operating information from the communicator to a computer.

In another aspect of the present invention, there is provided a laundry room management system including: laundry room machines disposed in a laundry room and used for performing at least one of a washing operation and a drying operation; payment devices disposed at the laundry room machines for collecting payment for operating the laundry room machines; a computer for managing operating information of the laundry room machines; a communicator for assigning identification information to the laundry room machines, setting the rate and operating conditions, and collecting operating information through intermediating operating information between the laundry room machine and the computer; and a master key recognized by the laundry room machine through the payment device and used for setting the rate and operating conditions, wherein the laundry room machines include one interface for communicating with the communicator, and the other interface for transferring information about collecting payment from the payment device.

The payment device may include at least one of a coin drop assembly and a card reader.

The master key may include at least one of a service door key interlocked with the coin drop assembly and a service card interlocked with a card reader.

The coin drop assembly may include a door, a key hole for receiving a service door key to open or to close the door, and a sensor for checking whether the service door key is inserted or not.

A plurality of laundry room machines may be equipped in a laundry room, and a plurality of laundry room machines may include a washer and a dryer.

In yet another aspect of the present invention, there is provided a commercial laundry room machine including: a first interface for communicating with payment devices disposed corresponding to each of laundry room machines to transfer payment collecting information; a second interface for communicating with a communicator to transfer at least one of identification information including an ID (identifier) of each laundry room machine, rate information, and operating information; and a controller for controlling operation of laundry room machines according to communication information of the first and second interfaces.

The payment device may be a coin drop assembly and/or a card reader, which are mounted at an outer surface of the laundry room machine, and the payment device may communicate with the first interface through a wired link. The communicator may communicate with the second interface through a wireless link, and the laundry room machine may be a washer or a dryer.

BRIEF DESCRIPTION OF THE DRAWINGS

The present invention will become better understood with reference to the accompanying drawings which are given only by way of illustration and thus are not limitative of the present invention, wherein.

BEST MODE FOR CARRYING OUT THE INVENTION

A laundry room management method and system in accordance with preferred embodiments of the present invention will now be described in detail with reference to the accompanying drawings.

Figure 1:
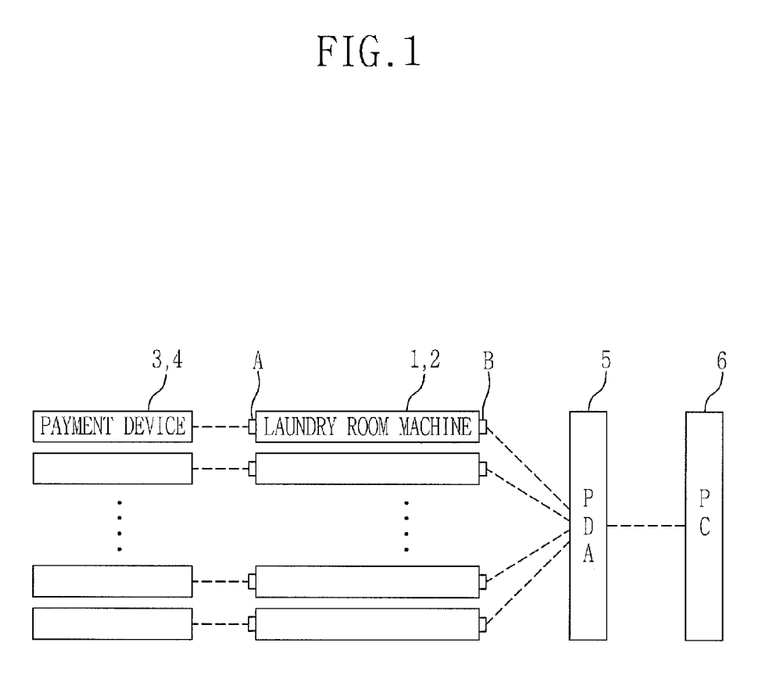
FIG. 1 is a diagram illustrating a laundry room management system according to an embodiment of the present invention.

FIG. 1 is a diagram illustrating a laundry room management system according to an embodiment of the present invention.

As illustrated in FIG. 1, the laundry room management system according to the present embodiment include laundry room machines 1 and 2, payment devices 3 and 4, a communicator 5, and a computer 6. The laundry room machines 1 and 2 are equipped in a laundry room. The laundry room machines 1 and 2 perform at least one of a washing operation and a drying operation. Laundry room machines 1 and 2 include the payment devices 3 and 4 for collecting a payment for operating the laundry room machines 1 and 2. Also, the computer 6 such as a personal computer (PC) manages operating information of the laundry room machines 1 and 2. The communicator 5 such as a personal digital assistant (PDA) assigns identification information to the laundry room machines 1 and 2, sets the rate and operating conditions, and intermediates operating information between the computer 6 and the laundry room machines 1 and 2.

The laundry room machines 1 and 2 include interfaces A and B for communicating with the payment devices 3 and 4 and with the communicator 5.

Figure 2:
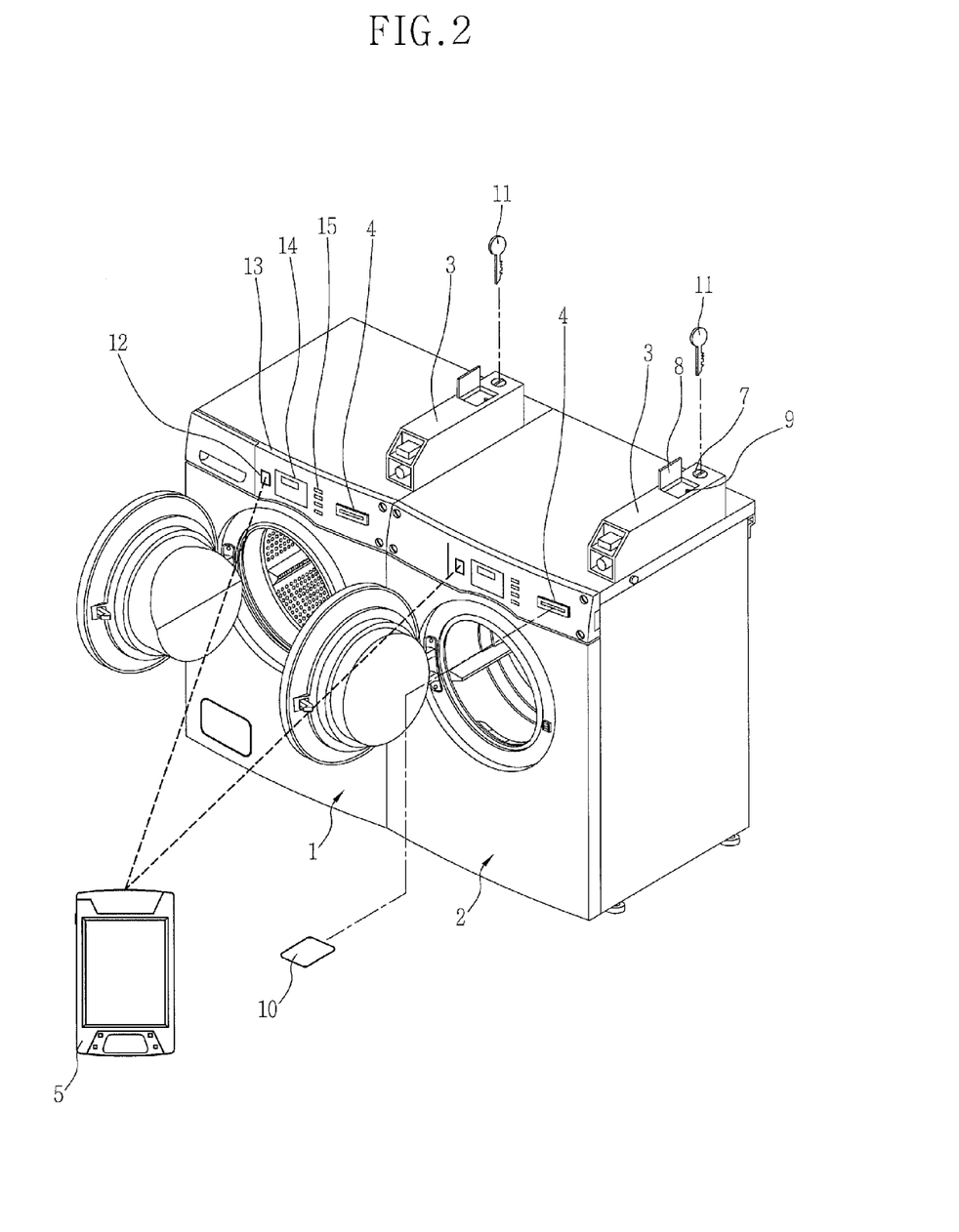
FIG. 2 is a diagram illustrating laundry room machines according to an embodiment of the present invention.

FIG. 2 is a diagram illustrating laundry room machines according to an embodiment of the present invention.

In FIG. 2, the laundry room machine 1 denotes a washer, and the laundry room machine 2 denotes a dryer. Each of the laundry room machines 1 and 2 includes a coin drop assembly 3 mounted on a top thereof and a card reader 4 disposed at a control panel 13 prepared on an upper side thereof as the payment device. A user is allowed to use the laundry room machines 1 and 2 by inserting coins or a debit card into the payment devices 3 and 4. A manager is enabled to set information about the rate and operating conditions by inserting a master key 10 or 11 such as a service card 10 or a service door key 11 into the payment devices 3 and 4. The coin drop assembly 3 includes a key hole 7 for receiving a service door key 11, and a sensor 9 for determining whether a service door key 11 is inserted or not through sensing the service door key 11. A sensor may be disposed directly at the key hole 7 in order to sense the service door key 11. The payment devices 3 and 4 are connected to the control panel 13 through a cable (not shown) so as to communicate with the laundry room machines 1 and 2. The communicator 5 communicates with the laundry room machines 1 and 2 through the interfaces 12, the interface B in FIG. 1, in a short range Infrared data communication scheme. The control panel 13 includes a display unit 14 and control buttons 15. The control panel 13 displays the amount of money inserted into the laundry room machine, displays conditions for operating the laundry room machine, and enables a user or a manager to set or to select operating conditions or a course.

Hereinafter, each of the constituent elements of the laundry room management system according to an embodiment of the present invention will be described.

1. Laundry room machines 1 and 2

Each of the laundry room machines 1 and 2 is a washer or a dryer. Also, each of the laundry room machines 1 and 2 may be an all-in-one washer and dryer. A plurality of laundry room machines are equipped in a laundry room for performing a washing operation, a drying operation, or a washing and drying operation.

In order to manage the laundry room machines 1 and 2, identification information having an identifier (ID) is assigned to the laundry room machines 1 and 2. The identification information may include serial numbers and location information of the laundry room machines 1 and 2. Since the identification information is assigned to the laundry room machines as described above, the laundry room machines can be separately managed.

It is preferable to allow only the communicator 5 to assign the identification information. Further preferably, the identification information is assigned only before inputting the identification information into the laundry room machines 1 and 2 in order to prevent the assigned identification information from being modified. That is, the identification information is modified only when the laundry room machine is reset to have a state of no identification information inputted like a newly manufactured laundry room machine. Since the identification information is prevented from being modified, the laundry room machine 1 and 2 can be stably managed without confusion.

In order to operate the laundry room machines 1 and 2, the rate and operating conditions must be set. The rate and the operating conditions can be set by the communication with the communicator 5 or by the operation of the control panel 13 with the master key 10 or 11 inserted according to the present embodiment. Due to such a method of setting up the rate and the operating conditions according to the present embodiment, only a manager who has the communicator 5 or the master key 10 or 11 is allowed to set the rate and the operating conditions. Therefore, the laundry room management system according to the present embodiment can prevent users from modifying the rate and the operating conditions of the laundry room machines.

After a user inserts coins or a card to the payment devices 3 or 4 and sets the operating conditions through the control panel 13, the laundry room machines 1 and 2 performs predetermined operations according to the set operating conditions and records operating information thereof.

Then, the laundry room machines 1 and 2 transmit the recorded operating information to the communicator 5 in response to a request from the communicator 5.

2. Payment devices 3 and 4

The payment devices 3 and 4 are a coin drop assembly 3 and a card reader 4. Each of the laundry room machines 1 and 2 includes one of the coin drop assembly 3 and the card reader 4 or both of the coin drop assembly 3 and the card reader 4.

The payment devices 3 and 4 check whether or not a coin or a card is inserted. If payment devices 3 and 4 detect insertion of the coin or the card, the payment devices 3 and 4 inform the laundry room machines 1 and 2 of the insertion. When the mater keys 10 and 11 are inserted, the payment devices 3 and 4 also notice the insertion of the master keys to the laundry room machines 1 and 2. Then, the laundry room machine 1 and 2 changes a current mode to a setting mode.

3. Communicator 5

The communicator 5 is a device for communicating with the laundry room machines 1 and 2 and the computer 6. It is preferable to use a personal digital assistant (PDA) capable of communicating with the laundry room machines 1 and 2 as the communicator in a short range infrared data communication scheme. A mobile phone may be used as the communicator if the capacity thereof allows.

The communicator 5 has a unique function of assigning identification information to the laundry room machines 1 and 2. The communicator 5 also has functions of setting the rate and operating conditions of the laundry room machines 1 and 2, collecting the recorded operating information of the laundry room machines 1 and 2, and transmitting the collected information to the computer 6. The collected operating information is transmitted to the computer for management. However, the collected operating information may be transmitted to the communicator 5 and displayed on the communicator 5 in order to easily confirm the operating information.

4. Computer 6

In case of managing a small sized laundry room, a personal computer (PC) is sufficient to use as the computer 6. In case of managing a plurality of laundry rooms, a computing system composed of a plurality of computers can be used.

The computer 6 manages the operating information of the laundry room machines 1 and 2, which are transferred from the communicator 5. Furthermore, the computer 6 can set the communicator 5 to manage managers having the communicator 5, for example, to assign authority. Based on such a setting, the communicator 5 may be set to perform all or one of an operation of assigning identification information, an operation of setting operating information, and an operation of collecting operating information.

Figure 3:
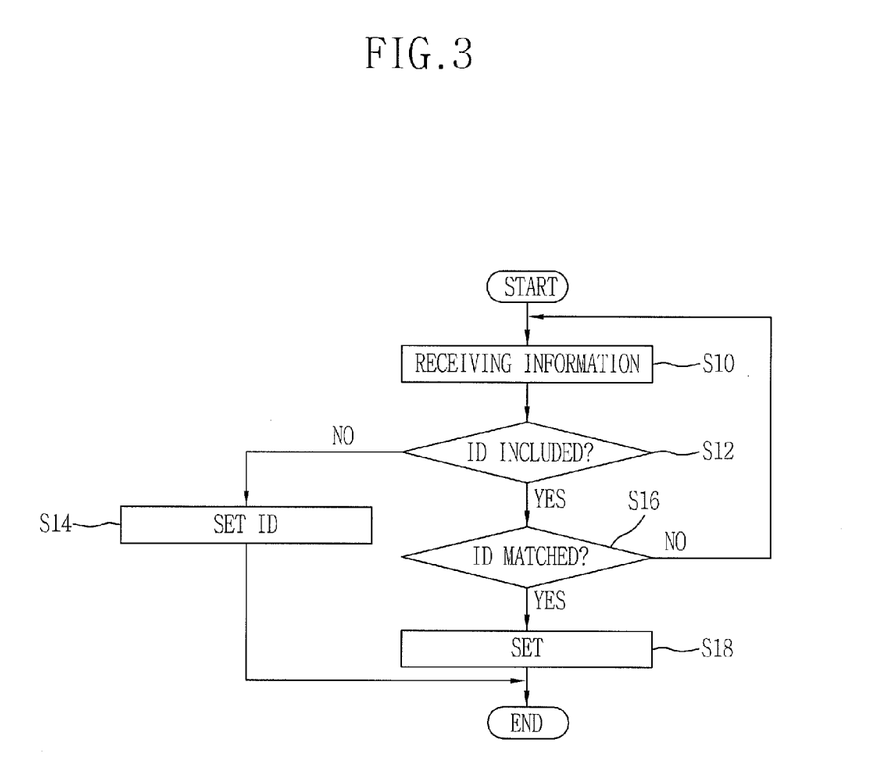
FIG. 3 is a flowchart illustrating a method for setting identification information and operating conditions according to an embodiment of the present invention.

FIG. 3 is a flowchart illustrating a method for setting identification information and operating conditions according to an embodiment of the present invention.

Referring to FIG. 3, the laundry room machines 1 and 2 receive information from the communicator 5 at step S10. Then, the laundry room machines 1 and 2 determine whether an ID is included in the received information or not at step S12. If the ID is not included, an operation of inputting identification information including an ID is performed at step S12. If the ID is included, the laundry room machines 1 and 2 determine whether the received ID is matched with previously stored IDs at step S16. If the ID is matched with the previously stored ID, information about the rate and operating conditions is set at step S18. In FIG. 3, the identification information is inputted or the operating conditions are set according to whether the ID is included in the received information or not. However, the described method is only a preferred exemplary embodiment of the present invention. When the communicator 5 transfers the information, the communicator 5 may inform the laundry room machines 1 and 2 of a setting related to the transferred information.

Figure 4:
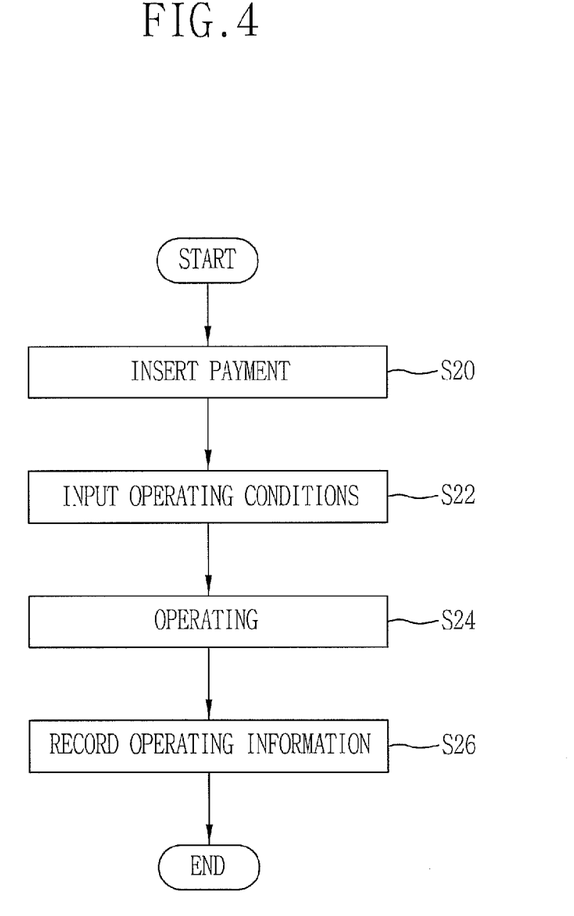
FIG. 4 is a flowchart illustrating a method of operating laundry room machines according to an embodiment of the present invention.

FIG. 4 is a flowchart illustrating a method of operating laundry room machines according to an embodiment of the present invention.

Referring to FIG. 4, the laundry room machines 1 and 2 receive information about the insertion of a coin or a card from the payment device 3 and 4 at step S20. The laundry room machines 1 and 2 display the received information on the display unit 14 and receives operating conditions through control buttons 15 at step S22. Then, the laundry room machines 1 and 2 perform related operations at step S24 and record operating information about the performed operations at step S26.

Figure 5:
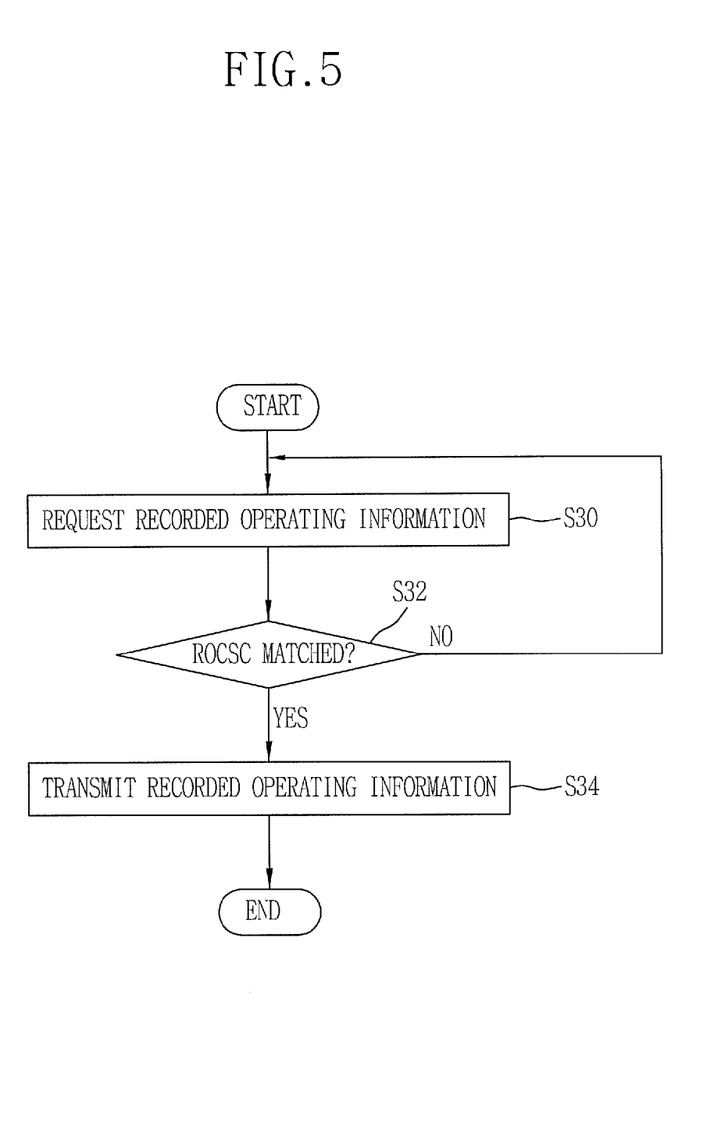
FIG. 5 is a flowchart illustrating a method of transmitting operating information to a communicator according to an embodiment of the present invention.

FIG. 5 is a flowchart illustrating a method of transmitting operating information to a communicator according to an embodiment of the present invention.

Referring to FIG. 5, the laundry room machines 1 and 2 receives a request of transmitting the recorded operating information from the communicator 5 at step S30. In response to the request, the laundry room machines 1 and 2 transmit the recorded operating information to the communicator 5 at step S34. Here, the laundry room machines 1 and 2 also transmit the identification information to the communicator 5 with the recorded operating information. It is preferable that the communicator 5 may transmit a router operator communication security code (ROCSC) when the request is made, and the laundry room machines 1 and 2 compare the received ROCSC with previously stored ROCSC at step S32 before transmitting the recorded operating information. In this case, the ROCSC is assigned with the ID when the identification information inputs. Due to the ROCSC, the communicator 5 can communicate with one of the laundry room machines 1 and 2 without interfering to the other, and it prevents laundry room machines 1 and 2 from transmitting operating information unintentionally.

The laundry room management system and method according to the certain embodiment of the present invention can effectively and efficiently manage the laundry room machines equipped in the laundry room.

Also, the laundry room machines can be protected from malicious attack by customers.

Furthermore, the laundry room management system and method according to the certain embodiment of the present invention assigns identification information to laundry room machines through the communicator and prevents the assigned identification from being modified. Therefore, the laundry room machines can be separately and stably managed without confusion.

Moreover, the laundry room management system and method according to the certain embodiment of the present invention separately manages the laundry room machine in software manner using a communicator such as a personal digital assistant (PDA), which intermediates communication between a plurality of laundry room machine and a personal computer (PC). Therefore, laundry room machines can be effectively and efficiently managed without additional high expenses and additional equipment.

The laundry room management system and method according to the certain embodiment of the present invention defines authority of a manager logged in a communicator. Therefore, managers can be managed.

The laundry management system and method according to the certain embodiment of the present invention sets the laundry room machines using the communicator or the master key. Therefore, it prevents users from modifying setting of the laundry room machine.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A laundry room management method using a laundry room management system including laundry room machines in a laundry room and used for performing at least one of a washing operation and a drying operation, payment devices mounted on each of the laundry room machines for collecting payment for operating the laundry room machines, a computer for managing operating information of the laundry room machines, and a communicator for intermediating operating information between the laundry room machines and the computer, the method comprising:
  a) assigning identification information including an identifier (ID) to the laundry room machines through the communicator in a state when no identification information is inputted to the laundry room machine, and storing said identification information in the laundry room machines, wherein the identification information assigned to the laundry room machine may be modified only after the laundry room machine is reset to have a state of no identification information inputted;
  b) setting, at the laundry room machines, information about the rate and operating conditions through the communicator, only after the identification information transferred to the laundry room machine from the communicator is matched with the identification information stored in the laundry room machine;
  c) performing a predetermined operation allowed by the setting of the rate and operating conditions according to an inserted payment after receiving information about insertion of the payment from the payment device, through the respective laundry room machine;
  d) recording operating information of the performed operation through the respective laundry room machine; and
  e) transmitting the recorded operating information to the communicator through the respective laundry room machine in response to a request of the communicator.

2. The laundry room management method of claim 1, wherein transmitting the recorded operating information includes transmitting the identification information together with the recorded operation information to the communicator.

3. The laundry room management method of claim 1, wherein the laundry room management system further includes a master key recognizable by the laundry room machines through the payment device, and the setting the information about the rate and operating conditions is performed when the compared identification information are matched or when the master key is inserted.

4. The laundry room management method of claim 1, further comprising displaying operating information transmitted to the communicator through the communicator.

5. The laundry room management method of claim 1, further comprising transmitting operating information from the communicator to a computer.

6. A laundry room management system comprising:
  laundry room machines disposed in a laundry room and used for performing at least one of a washing operation and a drying operation;
  payment devices disposed at the laundry room machines for collecting payment for operating the laundry room machines;
  a computer for managing operating information of the laundry room machines;
  a communicator for assigning identification information to the laundry room machines, setting rate and operating conditions, and collecting operating information through intermediating operating information between the laundry room machine and the computer; and
  a master key recognizable by the laundry room machine through the payment device and used for setting the rate and operating conditions,
  wherein the laundry room machines include one interface for communicating with the communicator, and the other interface for transferring information about collecting payment from the payment device, and
  the communicator assigns or modifies the identification information to the laundry room machine only when the laundry room machine is in a state of no identification information inputted to the laundry room machine, and the communicator sets the rate and operating conditions only when the identification information is matched.

7. The laundry room management system of claim 6, wherein the payment device includes at least one of a coin drop assembly and a card reader.

8. The laundry room management system of claim 7, wherein the master key includes at least one of a service door key interlocked with the coin drop assembly and a service card interlocked with a card reader.

9. The laundry room management system of claim 8, wherein the coin drop assembly includes a door, a key hole for receiving a service door key to open or to close the door, and a sensor for checking whether the service door key is inserted or not.

10. The laundry room management system of claim 7, wherein a plurality of laundry room machines are equipped in a laundry room, and a plurality of the laundry room machines include a washer and a dryer.

11. A commercial laundry room machine, comprising:
- a first interface for communicating with payment devices disposed corresponding to each of laundry room machines to transfer payment collecting information;
- a second interface for communicating with a communicator to transfer at least one of identification information including an identifier (ID) of each laundry room machine, rate information, and operating information; and
- a controller for controlling operation of laundry room machines according to communication information of the first and second interfaces,
- wherein the identification information is assigned or modified to the commercial laundry room machine only when the commercial laundry room machine is in a state of no identification information inputted and the rate information and the operation information is set to the commercial laundry room machine only when the identification information is matched.

12. The commercial laundry room machine of claim 11, wherein the payment device is a coin drop assembly and/or a card reader, which are mounted at an outer surface of the laundry room machine, and the payment device communicates with the first interface through a wired link.

13. The commercial laundry room machine of claim 11, wherein the communicator communicates with the second interface through a wireless link.

14. The commercial laundry room machine of claim 11, wherein the laundry room machine is a washer or a dryer.

15. The commercial laundry room machine of claim 11, wherein the laundry room machine sets information in the laundry room machine by receiving identification information from the communicator and the laundry room machine compares the received identification information with previously received identification information.

16. The commercial laundry room machine of claim 15, wherein the laundry room machine transmits recorded operating information with the previously received identification information to the communicator.

17. The laundry room management system of claim 6, wherein the communicator transfers identification information with the rate and the operating conditions to the laundry room machine, and the laundry room machine compares the transferred identification information with previously received identification information that includes a serial number of the laundry room machine.

18. The laundry room management system of claim 6, wherein the laundry room machines transmit the previously received identification information of the laundry room machine and recorded operating information to the communicator.

19. The laundry room management system of claim 6, wherein previously received identification information of the laundry room machine is modified only when the laundry room machine is reset.

* * * * *